UNITED STATES PATENT OFFICE.

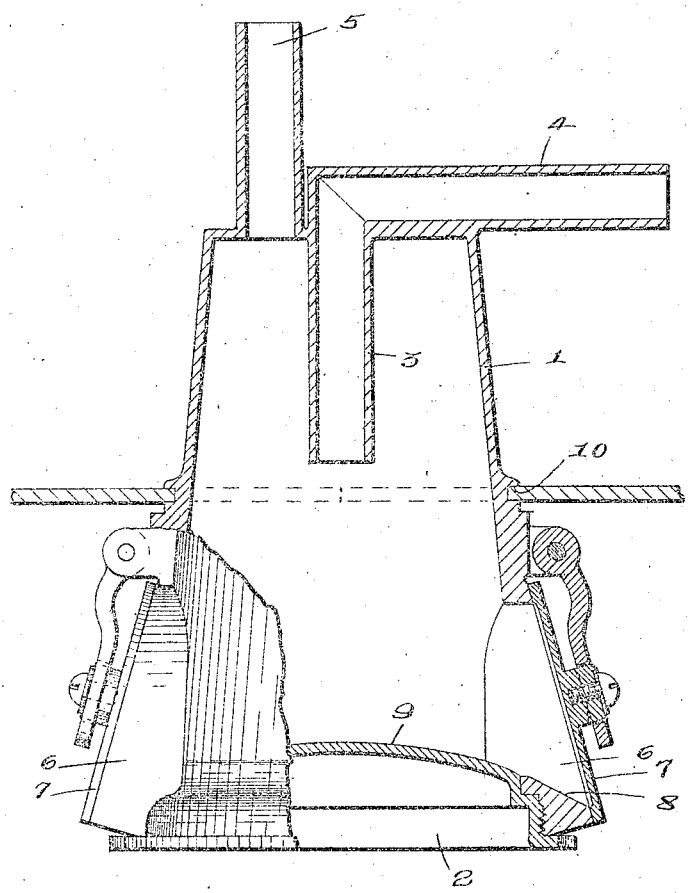

JAMES F. LEMON AND SAMUEL A. MacDONALD, OF SYRACUSE, NEW YORK.

MILKING-MACHINE.

1,168,016.

Specification of Letters Patent.

Patented Jan. 11, 1916.

Application filed August 7, 1914. Serial No. 855,578.

*To all whom it may concern:*

Be it known that we, JAMES F. LEMON and SAMUEL A. MACDONALD, citizens of the United States, and residents of Syracuse, in the county of Onondaga and State of New York, have invented a certain new and useful Milking-Machine, of which the following is a specification.

This invention relates to milking machines and has for its object a particularly simple and efficient vacuum chamber therefor, which can be readily cleaned and in which it is impossible for the milk to be drawn out through the suction pipe into the pump.

Other objects will appear throughout the specification.

In describing this invention, reference is had to the accompanying drawing, which is a vertical sectional view, partly in elevation, of a preferable embodiment of our invention, the contiguous portion of a milk pail cover being also shown.

This vacuum chamber comprises a vertically elongated body provided with a removable closure at its lower end, an intake pipe extending into the body preferably through the top thereof and depending some distance below the top, and a suction pipe opening through the top and terminating above the lower end of the intake pipe. The suction pipe usually terminates at the inner face of the top. The body is also formed with a milk outlet located in its side and near the bottom.

1 is the body which is here shown in the form of a truncated cone open at its lower end, and closed at its top.

2 is the closure threading into the lower end of the body.

3 is the intake pipe extending into the body 1 substantially centrally thereof, and terminating near the center, here shown as slightly above the center.

4 is a pipe mounted on the top of the chamber 1 and extending horizontally from the pipe 3 beyond the sides of the same for connection with the tube which is connected to the parts which engage the teats of the cow.

5 is the suction pipe which stands vertically on the top, this pipe being designed to be connected to the pump in the usual manner, as will be understood by those skilled in the art.

The body 1 is here shown as provided with two milk outlets 6 located in the sides thereof and near the bottom, the outlets being controlled by pivoted flap valves 7. The lower sides or bottoms 8 of the outlets are flat and incline downwardly and outwardly and the inner face 9 of the closure 2 is convexed inwardly, and is alined at its margins with the bottoms 8 of the outlets so that the milk will have an easy path through the outlets.

The body is provided intermediate of its ends with means for engaging the margin of the wall around the hole in the cover of the milk pail, on which cover the vacuum chamber is mounted. Said means consists of an external annular groove 10, and the cover of the pail may be formed in two sections the lines of division between the same extending diametrically through the hole so that when the sections are brought together the margins of the halves of the hole will come in the groove 10. The cover may be constructed in any suitable manner to enter the groove 10.

Owing to the arrangement of the inlet 3 and suction pipe 5, it is impossible for the suction to draw the milk or milk spray through the suction pipe and into the pump. Owing to the shape of the body, the milk has a ready egress therethrough, and furthermore, it can be readily attached to the milk pail cover or inserted through the hole thereof, owing to its conical shape, and for this purpose it is only necessary that the upper portion be conical. Furthermore, owing to the conical form of the body, it can be readily cleaned upon the removal of the closure 2.

What we claim is:—

1. A milking machine comprising a vertical elongated body open at its bottom, and a removable closure at the lower end of the body, and inlet and suction pipes at the top of the body, the body having a milk outlet at the lower end of the body, substantially as and for the purpose described.

2. In a milking machine, a vacuum chamber comprising an elongated body in the form of a truncated cone, inlet and suction pipes at the top of the body, a removable closure at the lower end of the body, and an outlet for the milk in the side of the body and near the lower end thereof, substantially as and for the purpose specified.

3. In a milking machine, a vacuum chamber comprising an elongated body in the form of a truncated cone having means between its ends for engaging the margin of the wall around the opening in the cover of a milk pail, the body also having an inlet extending through the top thereof substantially centrally of the body and terminating near the center of the body, a suction pipe opening through the top and terminating at the inner face of the top, a removable closure for the lower end of the body, and a milk outlet located at the side of the body near the lower end thereof, substantially as and for the purpose described.

4. In a milking machine, a vacuum chamber comprising a body open at its lower end, a closure for the lower end of the body, the body having a milk inlet and a suction pipe in its upper portion, and a milk outlet in its side and near its lower end, the bottom of the milk outlet being inclined downwardly and outwardly, and the inner face of the closure being convex and alined at its margin with the bottom of the milk outlet, substantially as and for the purpose specified.

5. In a milking machine, a vacuum chamber comprising an elongated body in the form of a truncated cone having means between its ends for engaging the margin of the wall around the opening in the cover of a milk pail, the body also having an inlet pipe extending through the top thereof, substantially central of the body and terminating near the center of the body, a suction pipe opening through the top and terminating at the inner face of the top, a removable closure for the lower end of the body, and a milk outlet located in its side and near its lower end, the bottom of the milk outlet inclining downwardly and outwardly, and the inner face of the closure being convex and the margin thereof being alined with the bottom of the outlet, substantially as and for the purpose set forth.

In testimony whereof, we have hereunto signed our names in the presence of two attesting witnesses, at Syracuse, in the county of Onondaga, in the State of New York, this 24th day of July, 1914.

JAMES F. LEMON.
SAMUEL A. MacDONALD.

Witnesses:
S. DAVIS,
J. GLAZIER.